Sept. 10, 1940.    A. C. SMITH    2,214,597
SELF-INFLATING INNER TUBE FOR TIRES
Filed May 24, 1939

INVENTOR
Arthur C. Smith
BY Zoltan Holechek
ATTORNEY

Patented Sept. 10, 1940

2,214,597

UNITED STATES PATENT OFFICE 2,214,597

SELF-INFLATING INNER TUBE FOR TIRES

Arthur C. Smith, Rosenberg, Tex.

Application May 24, 1939, Serial No. 275,383

5 Claims. (Cl. 152—426)

This invention relates to new and useful improvements in a pneumatic tire and has specific reference to a self-inflating inner tube.

The invention proposes an inner tube which is characterized by a sectional connecting rod mounted across the outer and inner walls of the inner tube and associated with an air pumping mechanism in a novel manner to continuously supply air to the inner tube under certain conditions while a vehicle is traveling which is equipped with the inner tube.

More specifically, the invention proposes an arrangement whereby the flexing of the tire shoe and the inner tube during the turning of a wheel of a vehicle provided with the same, causes the pumping of air into the inner tube to maintain a predetermined pressure. Still further the invention proposes an arrangement whereby the pumping actions cease when the correct pressure is reached within the tire, irrespective of the fact that the wheel still continues to turn and the tire portions to flex.

Still further the invention proposes a novel arrangement by which it is possible to adjust the relative positions of the sections of the connecting rod previously mentioned to compensate for wear of the device.

Another object resides in constructing the connecting rod of rubber having sufficient stiffness to transmit the pumping action desired and yet be sufficiently flexible to bend and fold up in the event that the tire goes flat.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Figure 1:
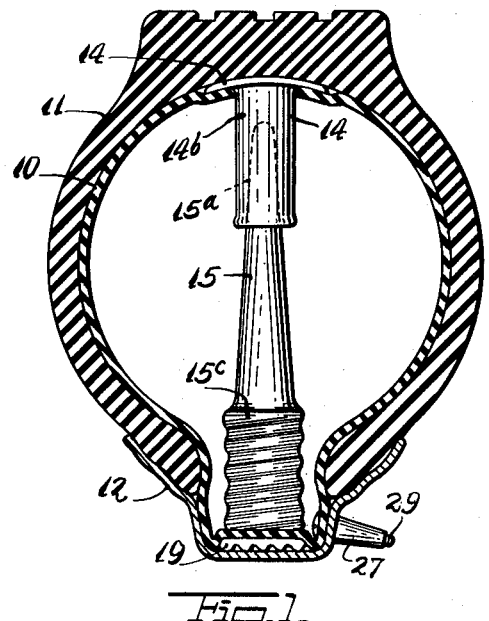
Fig. 1 is a transverse sectional view of a tire and inner tube equipped with a self-inflating device constructed according to this invention.
Figure 2:
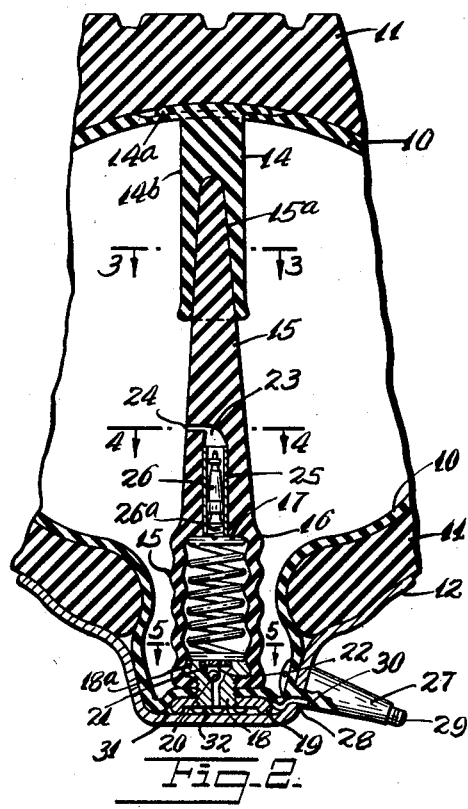
Fig. 2 is a fragmentary enlarged view similar to a portion of Fig. 1 but showing additional parts in section.
Figure 3:
Fig. 3 is a horizontal sectional view taken on the line 3—3 of Fig. 2.
Figure 4:
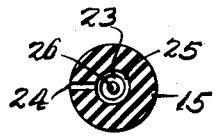
Fig. 4 is a horizontal sectional view taken on the line 4—4 of Fig. 2.
Figure 5:
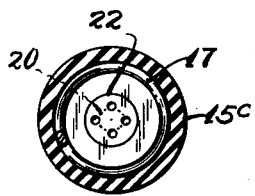
Fig. 5 is a horizontal sectional view taken on the line 5—5 of Fig. 2.
Figure 6:
Fig. 6 is a bottom view of the nut used for securing the pumping device to the inner tube.

The self-inflating inner tube, according to this invention, includes an inner tube casing 10 engageable into a tire casing 11 for mounting on a wheel rim 12 in the conventional manner. A connecting rod extends between walls of the casing and consists of an outer section 14 mounted within the casing 10 at a certain point on the outer wall of the casing. This outer section 14 of the connecting rod is constructed of rubber and is vulcanized on to the inner tube 10 to be integral therewith. The section 14 is provided with a head portion 14$^a$ disposed outside of the inner tube in engagement with the outer face thereof and the shank portion 14$^b$ which extends into the inner tube. This connecting rod section 14 is of stiff rubber strong enough to transmit a force for flexing a bellows downwards as hereinafter more fully described, and of sufficient flexibility to bend or double up in the event of a flat or blowout without injury to the inner tube.

The connecting rod further consists of an inner section having a reduced outer end 15$^a$ engaging into a receiving opening formed in the end 14 of the outer section of connecting rod. This inner section of connecting rod 15 is mounted within the tube casing 10 at a point opposed to the point on the outer wall where the outer section of connecting rod 14 is mounted. The inner end of the inner section of connecting rod 15 is formed with a bellows construction 15$^c$. This bellows construction is reinforced with imbedded cords 16 or similar reinforcement to prevent lateral expansion thereof. The inner section of connecting rod 15 is also made of rubber sufficiently rigid to transmit a compression force to the bellows 15$^c$ and yet sufficiently flexible to bend or double up in the event of a flat or blowout without injury to the inner tube casing.

A resilient means is provided for normally urging the bellows 15$^c$ into an extended condition. This resilient means, essentially, consists of an expansion spring 17 disposed within the bellows and acting between the inner and outer ends thereof. A tubular member 18 is mounted through the inner tube casing 10 and the inner end of the bellows 15$^c$. This tubular member 18 has an enlarged head 18$^a$ at its outer end within the bellows 15$^c$ for gripping and engaging the material around the tubular member. A nut 19 threadedly engages on the outer end of the tubular member and against the outer face of the material of the inner tube casing 10 for clamping the bellows fixedly in position under sufficient pressure to make an air-tight connection so that the inner tube casing does not leak.

A check valve 20 for permitting air to enter the bellows through the tubular member 18 is mounted within the tubular member. This check valve is held within the end cavity 21 of the tubular member 18 by a perforated cage 22. The arrangement is such that when air tends to enter the bellows through the tubular member 18 the valve lifts, but is restrained from moving too far by the cage 22. When air attempts to leave the bellows the valve 20 is forced upon its seat preventing the passage of the air.

The outer end of the bellows 15c connects with a passage 23 extending axially through the inner section of connecting rod 15 and terminating in a side opening 24 discharging into the interior of the inner tube casing. Within this passage 23 there is a metal tube 25. This metal tube is firmly anchored in position by intimately engaging the wall of the passage. A conventional one way air valve 26 is mounted within the tube 25, and its threaded portion 26a threadedly engages the inner end of the tube 25.

The inner tube casing 10 is provided with a conventional valve stem 27 passing through an opening 28 formed in the wheel rim 12. This stem 27 is provided with a cap 29 and with an interior air valve, not shown on the drawing, but generally used in conjunction with inner tubes. A bleed passage 30 is formed longitudinally along one side of the stem 27 and communicates with a space 31 surrounding the nut 19. The nut 19 is formed with a plurality of passages 32 connecting with the passage 31 to permit air to enter the tubular member 18.

The operation of the device is as follows:

The inner tube casing 10 is inflated within the tire casing 11 in the conventional manner through the valve stem 27. The tire is brought up to the pressure recommended by the manufacturer. The parts are so designed that during operation of a vehicle provided with the tire there will be a pumping action upon the bellows 15c in the event that the pressure of the tire falls below the pressure recommended by the manufacturer.

It is known that, the portion of the tire engaging the ground is caused to flex inwards and as that particular portion moves away from the ground it flexes outwards. This flexing action is depended upon to cause the outer connecting rod section 14 to press inwards the inner connecting rod section 15 which compresses the bellows 15c. The interengagement of the adjacent ends of the connecting rods 14 and 15 is in the manner of a glove, that is, it may be pulled apart. They are not secured together by glue or vulcanization or other holding medium. It is for this reason that when a predetermined pressure within the tire is reached the outer section of the connecting rod 14 will be slightly off the adjacent end of the inner section of the connecting rod 15 and so there will be no transmission of a compressing action on the bellows.

As the bellows 15c are compressed by the action of the connecting rod and are expanded by the action of the spring 17, air will be pumped by the bellows in conjunction with the valves 20 and 26, into the inner tube. This pumping action serves to maintain the pressure within the tire except if there is a blowout or a leak that is too large to be made up by the operation of the pumping system.

Figure 7:
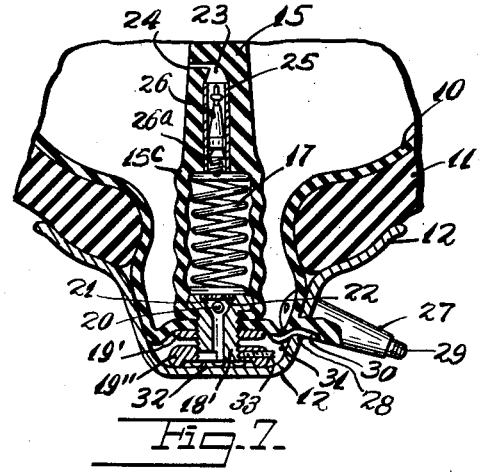
Fig. 7 is a fragmentary sectional view similar to the lower portion of Fig. 2 but illustrating a modified construction.

In Fig. 7 a modified form of the invention has been disclosed which distinguishes from the prior form in the fact that a nut 19' threadedly engages the tubular member 18' for holding the tubular member in position upon the wall of the inner tube casing 10. An auxiliary nut 19'' is threadedly engaged on the tubular member 18' and is adapted to be screwed in or screwed out a small distance to hold the connecting rod section 15 spaced at a predetermined distance from the wall of the rim 12. A set screw 33 serves to fixedly secure the nut 19'' to the tubular member 18''. The nut 19'' is provided with the air passages 32 previously referred to so that air from the bleed 30 may always enter through the tubular member 18' when the pumping action of the bellows operates.

In the event that the contacting portions of the sections of the connecting rod become worn so that the pressure maintained by the pumping action does not come up to the requirement of the manufacturer, adjustment may be made externally of the inner tube casing 10 by adjusting the position of the nut 19''.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. In an inner tube casing, a self-inflating means, comprising an outer section of connecting rod mounted within the casing at one point on the outer wall thereof, an inner section of connecting rod mounted within the casing at a point opposed to said point and on the inner wall thereof and at its inner end having a bellows area, resilient means for extending said bellows, a tubular member mounted through said casing and bellows, valves for directing air from said bellows to the interior of said inner tube casing, said tubular member having a head upon its inner end and a nut threadedly engaged on its outer end, said nut being formed with grooves for the passage of air, said inner tube having a valve stem formed with a groove for the passage of air to the passages of said nut.

2. In an inner tube casing, a self-inflating means, comprising an outer section of connecting rod mounted within the casing at one point on the outer wall thereof, an inner section of connecting rod mounted within the casing at a point opposed to said point and on the inner wall thereof and at its inner end having a bellows area, resilient means for extending said bellows, a tubular member mounted through said casing and bellows, valves for directing air from said bellows to the interior of said inner tube casing, said tubular member having a head upon its inner end and a nut threadedly engaged on its outer end, said nut being formed with grooves for the passage of air, said inner tube having a valve stem formed with a groove for the passage of air to the passages of said nut, and the valve stem of said inner tube extending through the rim of a wheel for the tire.

3. In an inner tube casing, a self-inflating means, comprising an outer section of connecting rod mounted within the casing at one point on the outer wall thereof, an inner section of connecting rod mounted within the casing at a point opposed to said point and on the inner wall thereof and at its inner end having a bellows area, resilient means for extending said bellows, a tubular member mounted through said casing and bellows, a check valve for permitting air to enter the bellows through said tubular member, a check valve for controlling a passage from said bellows to the interior of said casing to permit air from the bellows to enter said casing, said inner and outer sections of said connecting rod having their adjacent ends connected together to operate said bellows in a slightly deflated condition of said tube, and means for holding said inner section of the connecting rod at various relative positions to the outer section thereof to compensate for the wearing action of the engaged ends of said sections.

4. In an inner tube casing, a self-inflating means, comprising an outer section of connecting rod mounted within the casing at one point on the outer wall thereof, an inner section of connecting rod mounted within the casing at a point opposed to said point and on the inner wall thereof and at its inner end having a bellows area, resilient means for extending said bellows, a tubular member mounted through said casing and bellows, a check valve for permitting air to enter the bellows through said tubular member, a check valve for controlling a passage from said bellows to the interior of said casing to permit air from the bellows to enter said casing, said inner and outer sections of said connecting rod having their adjacent ends connected together to operate said bellows in a slightly deflated condition of said tube, and means for holding said inner section of the connecting rod at various relative positions to the outer section thereof to compensate for the wearing action of the engaged ends of said sections, including a nut threadedly engaged on said tubular member and adapted to abut the rim of a wheel equipped with the tire.

5. In an inner tube casing, a self-inflating means, comprising an outer section of connecting rod mounted within the casing at one point on the outer wall thereof, an inner section of connecting rod mounted within the casing at a point opposed to said point and on the inner wall thereof and at its inner end having a bellows area, resilient means for extending said bellows, a tubular member mounted through said casing and bellows, a check valve for permitting air to enter the bellows through said tubular member, a check valve for controlling a passage from said bellows to the interior of said casing to permit air from the bellows to enter said casing, said inner and outer sections of said connecting rod having their adjacent ends connected together to operate said bellows in a slightly deflated condition of said tube, and means for holding said inner section of the connecting rod at various relative positions to the outer section thereof to compensate for the wearing action of the engaged ends of said sections, including a nut threadedly engaged on said tubular member and adapted to abut the rim of a wheel equipped with the tire, and means for fixedly holding said nut in adjusted positions.

ARTHUR C. SMITH.